United States Patent [19]

Lee

[11] Patent Number: 5,609,454
[45] Date of Patent: Mar. 11, 1997

[54] DRIVING ASSEMBLY FOR DRIVING OPPOSED MEMBERS TO MOVE TOWARD AND AWAY FROM EACH OTHER

[76] Inventor: Wen-Yuan Lee, 7F-3, No. 8, Lane 390, Sec. 1, Chien-Kang Rd., Tainan City, Taiwan

[21] Appl. No.: 374,171

[22] Filed: Jan. 18, 1995

[51] Int. Cl.$^6$ ............................................. F16B 35/00
[52] U.S. Cl. ........................... 411/384; 411/410; 411/412
[58] Field of Search ................................. 411/378, 383, 411/384, 389, 396, 410, 411, 412, 413, 546, 531; 403/21, 22

[56] References Cited

U.S. PATENT DOCUMENTS

| 310,229 | 1/1885 | Seely | 411/412 |
|---|---|---|---|
| 1,140,535 | 5/1915 | Schroeder | 411/389 |
| 1,539,829 | 6/1925 | Boutelle | 411/413 |
| 4,781,351 | 11/1988 | Parapetti | 411/413 |
| 5,272,788 | 12/1993 | Gilstrap | 403/21 |
| 5,333,747 | 8/1994 | Wike | 411/412 |

FOREIGN PATENT DOCUMENTS

| 166350 | 7/1950 | Austria | 411/424 |
|---|---|---|---|

Primary Examiner—Flemming Saether
Attorney, Agent, or Firm—Birch, Stewart, Kolasch & Birch, LLP

[57] ABSTRACT

A driving assembly for driving opposed first and second driven members includes an elongated rod and a stop unit. The elongated rod extends through a through-hole of the second driven member. The elongated rod has an enlarged threaded first portion which is adapted to extend threadably through a screw hole of the first driven member and which is sized to prevent extension of the first portion through the through-hole of the second driven member, and a second portion which is adapted to extend out of the through-hole of the second driven member. The first and second portions of the elongated rod extend from two sides of the second driven member. The stop unit is connected to the second portion of the elongated rod so as to prevent axial movement of the elongated rod toward the first driven member. Rotation of the elongated rod in a first direction is converted into movement of the first driven member toward the second driven member, while rotation of the elongated rod in the opposite direction is converted into movement of the first driven member away from the second driven member.

3 Claims, 3 Drawing Sheets

5,609,454

DRIVING ASSEMBLY FOR DRIVING OPPOSED MEMBERS TO MOVE TOWARD AND AWAY FROM EACH OTHER

BACKGROUND OF THE INVENTION

1. Field of the Invention

This invention relates to a driving assembly, more particularly to a driving assembly for driving opposed first and second driven members to move toward and away from each other and which is simple in construction and saves space.

2. Description of the Related Art

In stripping form panels from a concrete unit, a conventional hydraulic/pneumatic cylinder system is usually employed. However, the conventional hydraulic/pneumatic cylinder system is relatively complicated and bulky (occupies too much space). Therefore, there is a need for a driving assembly which is simple in construction and saves space.

SUMMARY OF THE INVENTION

Therefore, the main objective of the present invention is to provide a driving assembly which drives opposed first and second driven members to move toward and away from each other and which is simple in construction and saves space.

According to the present invention, a driving assembly is provided for driving opposed first and second driven members to move toward and away from each other. The first driven member is formed with a screw hole therethrough. The second driven member is formed with a through-hole therethrough. The through-hole of the second driven member is axially aligned with the screw hole of the first driven member. The driving assembly includes an elongated rod which extends through the through-hole of the second driven member, and a stop unit. The elongated rod has an enlarged threaded first portion which is adapted to extend threadably through the screw hole of the first driven member and which is sized to prevent extension of the first portion through the through-hole of the second driven member, and a second portion which is adapted to extend out of the through-hole of the second driven member. The first and second portions of the elongated rod extend from two sides of the second driven member. The stop unit is connected to the second portion of the elongated rod so as to prevent axial movement of the elongated rod toward the first driven member. Therefore, rotation of the elongated rod in one direction is converted into movement of the first driven member toward the second driven member, while rotation of the elongated rod in the opposite direction is converted into movement of the first driven member away from the second driven member.

BRIEF DESCRIPTION OF THE DRAWINGS

Other features and advantages of the present invention will become apparent from the following detailed description of the preferred embodiment, with reference to the accompanying drawings, of which.

DETAILED DESCRIPTION OF THE PREFERRED EMBODIMENT

Figure 1:
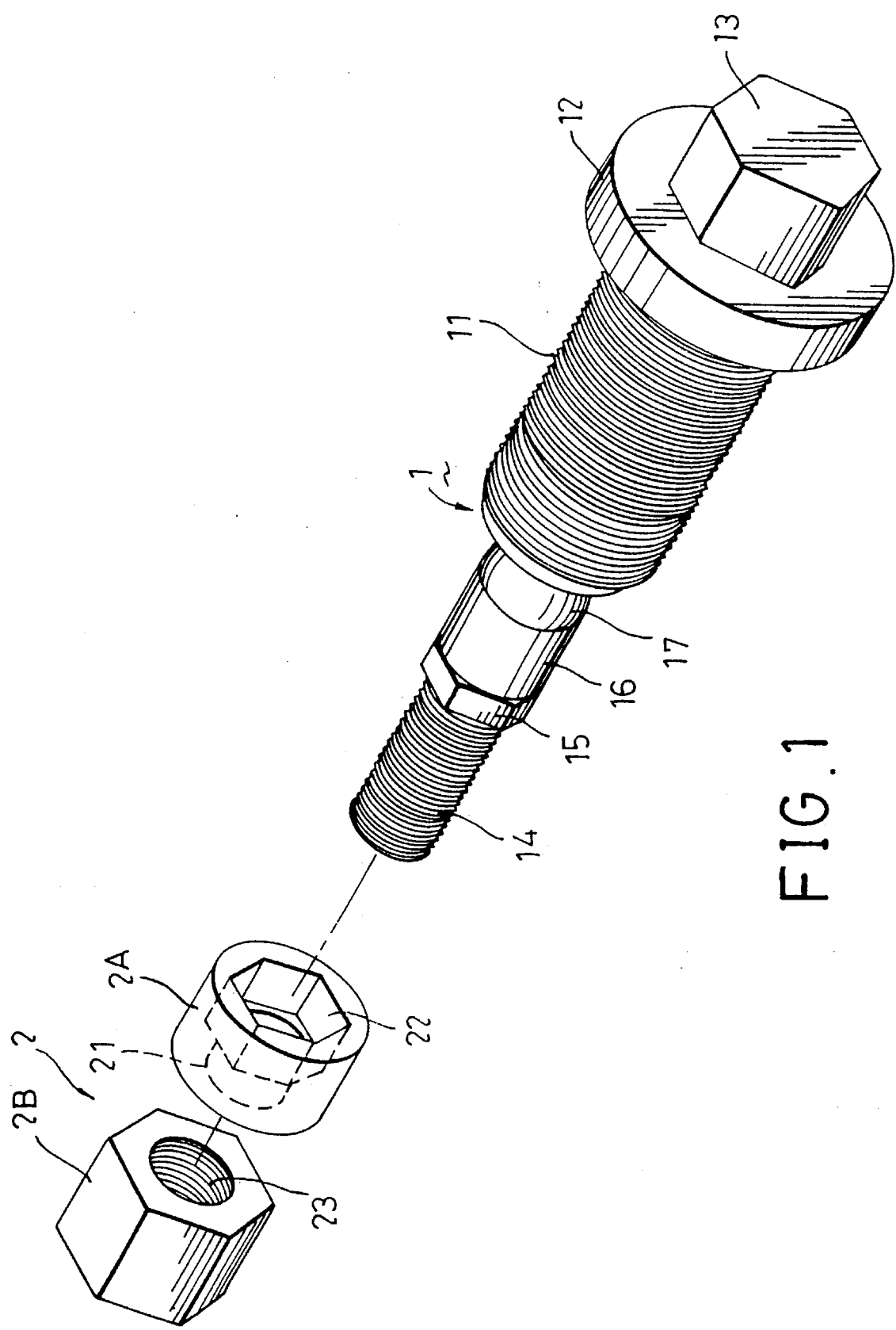
FIG. 1 is an exploded view of a driving assembly according to the present invention.
Figure 2:
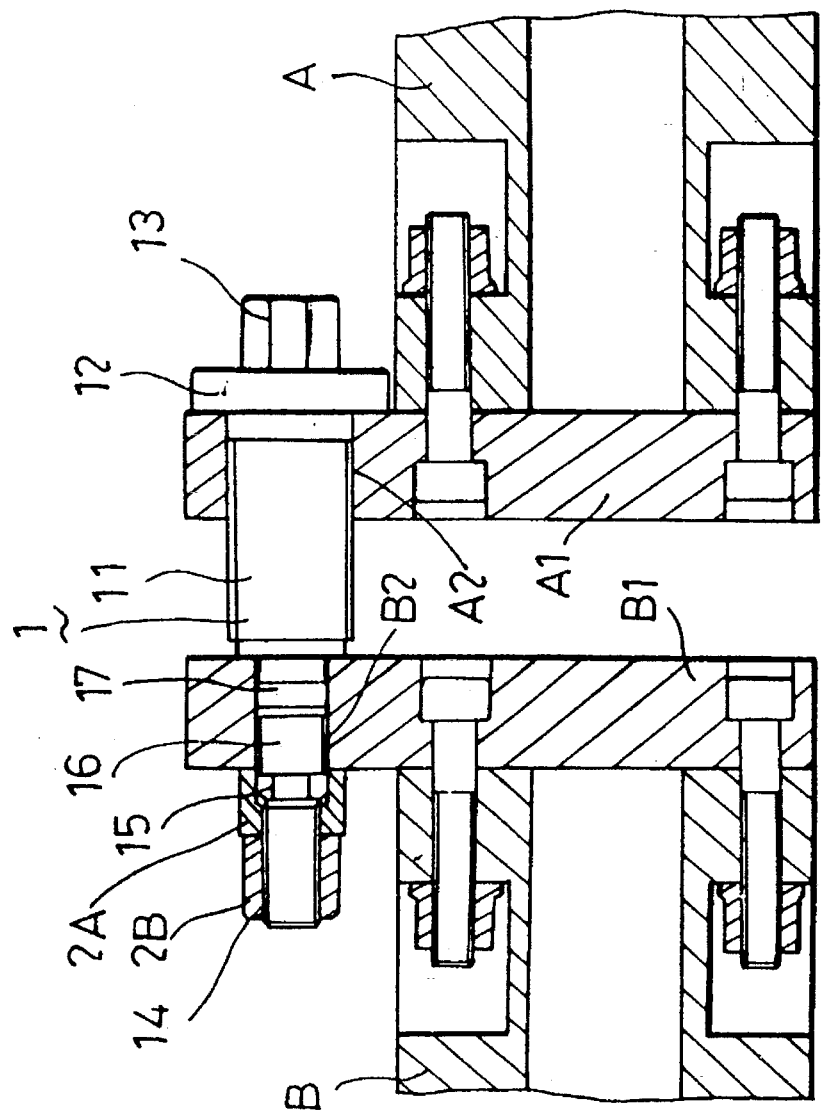
FIG. 2 is a partial sectional view showing the driving assembly shown in FIG. 1, the driving assembly being incorporated with two driven members.

Referring to FIGS. 1 and 2, a driving assembly according to the present invention is shown to drive opposed first and second driven members (A1 and B1) (see FIG. 2) to move toward and away from each other. In the present embodiment, the first driven member (A1) is secured to a form panel (A) (partly shown in FIG. 2), while the second driven member (B1) is secured to another form panel (B) (partly shown in FIG. 2). The first driven member (A1) is formed with a screw hole (A2) therethrough. The second driven member (B1) is formed with a through-hole (B2) therethrough. The through-hole (B2) of the second driven member (B1) is axially aligned with the screw hole (A2) of the first driven member (A1). The driving assembly includes an elongated rod 1 which extends through the through-hole (B2) of the second driven member (B1) and a stop unit 2.

The elongated rod 1 has an enlarged threaded first portion 11 which is adapted to extend threadably through the screw hole (A2) of the first driven member (A1) and which is sized to prevent extension of the first portion 11 through the through-hole (B2) of the second driven member (B1), and a second portion 14 which is adapted to extend out of the through-hole (B2) of the second driven member (B1) such that the first and second portions (11 and 14) of the elongated rod 1 extend from two sides of the second driven member (B1). The elongated rod 1 further has a third portion 16 which interconnects the first and second portions (11 and 14) thereof and which extends through the through-hole (B2) of the second driven member (B1). The third portion 16 has a polygonal member 15 which is mounted securely thereon and which is located adjacent to the second portion 14. The polygonal member 15 is located outside the through-hole (B2) of the second driven member (B1).

The third portion 16 is formed with an annular projection 17 which is arcuate in cross-section. The first portion 11 of the elongated rod 1 is formed with a radially and outward extending flange 12 which is located on one side of the first driven member (A1). The first portion 11 of the elongated rod 1 is further formed with a polygonal actuating head 13 which extends axially from the flange 12 and which has an axis (not shown) aligned with that of the elongated rod 1.

The stop unit 2 includes a sleeve member (2A) and a locking nut (2B). The sleeve member (2A) is formed with a receiving hole 22 which is complementary to the polygonal member 15 so as to receive the polygonal member 15 therein, and an axial rod-extending hole 21 which is in communication with the receiving hole 22 and which is sized to permit extension of the second portion 14 of the elongated rod 1 through the rodextending hole 21 and to prevent extension of the polygonal member 15 through the rod-extending hole 21. The sleeve member (2A) is sized so as not to extend through the through-hole (B2) of the second driven member (B1). The locking nut (2B) is connected threadably to the second portion 14 of the elongated rod 1 so as to clamp the sleeve member (2A) between the nut (2B) and the second driven member (B1).

To move the first driven member (A1) toward the second driven member (B1), the elongated rod 1 is rotated in one direction by, for example, a wrench means (not shown) which clamps the actuating head 13 of the elongated rod 1. Since the elongated rod 1 cannot move relative to the second driven member (B1), rotation of the elongated rod 1 is thus converted into axial movement of the first driven member (A1) toward the second driven member (B1), thereby causing movement of the form panel (A) toward the form panel (B). It should be noted that rotation of the elongated rod 1 is converted into axial movement of the first driven member (A1) away from the second driven member (B1) when the elongated rod 1 is rotated in the opposite direction. The first driven member (A1) moves away from the second driven member (B1) when the elongated rod 1 rotates in the opposite direction until the first driven member (A1) abuts against the radially and outward extending flange 12.

It should be noted that since the sleeve member (2A) is sleeved on the polygonal member 15, and since the locking nut (2B) clamps the sleeve member (2A) between the nut (2B) and the second driven member (B1), rotation of the elongated rod 1 will cause synchronous rotation of the sleeve member (2A) and the locking nut (2B) so that no angular rotation of the locking nut (2B) relative to the elongated rod 1 will occur, thereby preventing axial movement of the elongated rod 1 relative to the second driven member (B1). Thus, rotation of the elongated rod 1 will cause the first driven member (A1) to move toward and away from the second driven member (B1), thereby resulting in a relative movement between the form panels (A,B).

It should be appreciated that the first driven member (A1) is ideally parallel to the second driven member (B1) during the movement of the first driven member (A1) toward or away from the second driven member (B1). The provision of the projection 17 permits smooth operation of the elongated rod 1 when the first driven member (A1) slightly deviates from being parallel to the second driven member (B1) during the movement of the first driven member (A1) toward or away from the second driven member (B1).

Figure 3:
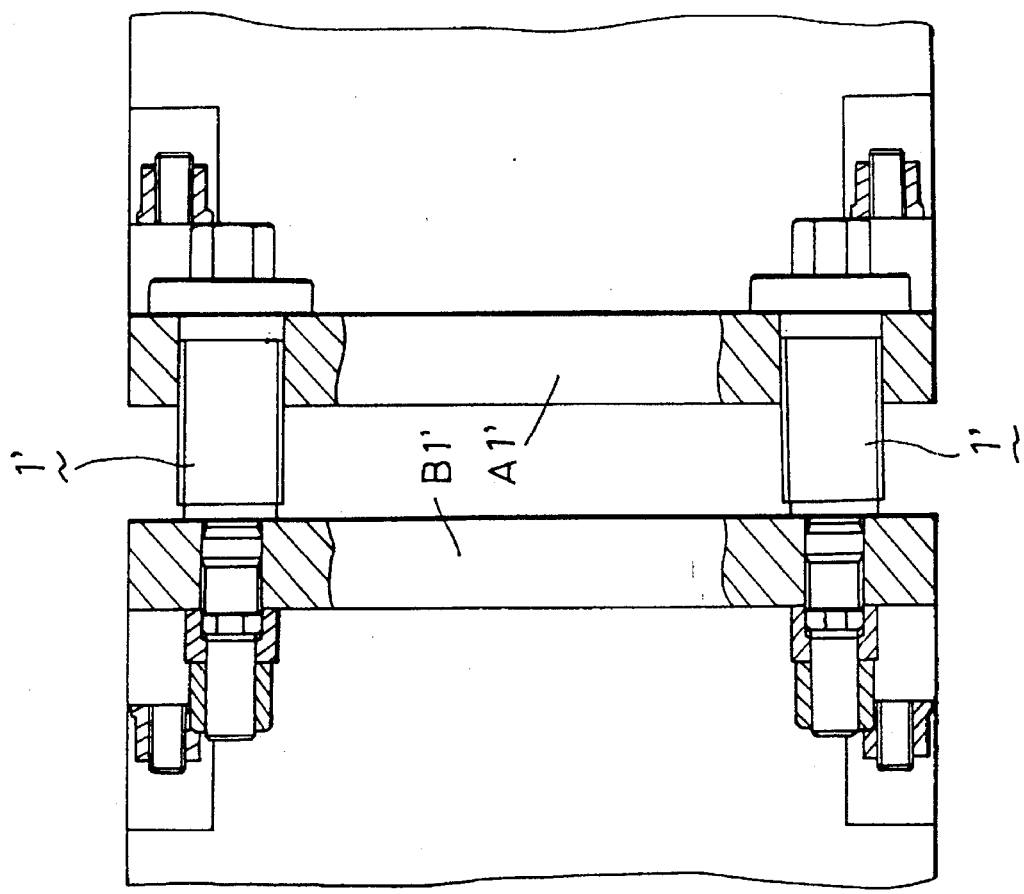
FIG. 3 is a partial sectional view similar to that of FIG. 2, wherein two driving assemblies are incorporated with the driven members.

Referring now to FIG. 3, two elongated rods 1' may be provided between the first and second driven members (A1' and B1') when the dimension of the latter is relatively large. In operation, the two elongated rods 1' are operated simultaneously.

In the present invention, the polygonal member 15 and the sleeve member (2A) are used to prevent rotation of the locking nut (2B) during the rotation of the elongated rod 1,1'. To this end, a second locking nut (not shown) may be connected threadably to the second portion 14 of the elongated rod 1,1' adjacent to the third portion 16 of the same such that the polygonal member 15 and the sleeve member (2A) can be eliminated.

Alternatively, eliminating the projection 17 of the elongated rod 1,1' and providing an appropriate gap (not shown) between the third portion 16 of the elongated rod 1,1' and the wall which defines the through-hole (B2) of the second driven member (B1) also permits smooth operation of the elongated rod 1,1' when the first driven member (A1,A1') slightly deviates from being parallel to the second driven member (B1,B1') during the movement of the first driven member (A1,A1') toward or away from the second driven member (B1,B1').

Moreover, the radially and outwardly extending flange 12 of the elongated rod 1,1' may be constructed to have an outer periphery similar to that of the polygonal actuating head 13 such that rotation of the elongated rod 1,1' may be achieved by clamping the flange with the wrench means. In this case, the actuating head 13 may be eliminated.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A driving assembly for driving opposed first and second driven members to move toward and away from each other, the first driven member being formed with a screw hole therethrough, the second driven member being formed with a through-hole therethrough, the through-hole of the second driven member being axially aligned with and having a smaller diameter than the screw hole of the first driven member, said driving assembly comprising:

an elongated rod having an enlarged threaded first portion adapted to extend threadably through the screw hole of the first driven member, a second portion adapted to extend out of the through-hole of the second driven member, and a third portion interconnecting said first and second portions and being adapted to extend through the through-hole of the second driven member, said third portion having a polygonal member provided thereon which is located adjacent to said second portion, said polygonal member adapted to be located outside the through-hole of the second driven member;

a stop unit including a sleeve member formed with a receiving hole which is complementary to said polygonal member receive said polygonal member therein, and an axial rod-extending hole which is in communication with said receiving hole and which is sized to permit extension of said second portion of said elongated rod through said rod-extending hole and to prevent extension of said polygonal member through said rod-extending hole; and a locking nut connected threadably to said second portion of said elongated rod so as to prevent disengagement of said sleeve member from said elongated rod in a direction toward said second portion of said elongated rod;

whereby rotation of said elongated rod in one direction is adapted to result in movement of the first driven member toward the second driven member, while rotation of said elongated rod in the opposite direction is adapted to result in movement of the first driven member away from the second driven member.

2. The driving assembly according to claim 1, wherein said first portion of said elongated rod is formed with a radially and outwardly extending flange, said flange being adapted to abut against the first driven member when the first driven member moves away from the second driven member by virtue of rotation of said elongated rod in said opposite direction.

3. The driving assembly according to claim 2, wherein said first portion of said elongated rod is further formed with a polygonal actuating head which extends axially from said first portion of said elongated rod through said flange and which has an axis aligned with that of said elongated rod.

* * * * *